United States Patent
Yuan et al.

(10) Patent No.: US 10,564,490 B2
(45) Date of Patent: Feb. 18, 2020

(54) ARRAY SUBSTRATE, METHOD FOR FABRICATING THE SAME, AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Shuai Yuan, Beijing (CN); Xiaona Liu, Beijing (CN); Yuqiong Chen, Beijing (CN); Mengjie Wang, Beijing (CN); Ning Li, Beijing (CN); Chenchen Wu, Beijing (CN); Ziyi Zheng, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 15/993,506

(22) Filed: May 30, 2018

(65) Prior Publication Data
US 2019/0064611 A1 Feb. 28, 2019

(30) Foreign Application Priority Data
Aug. 29, 2017 (CN) .......................... 2017 1 0762641

(51) Int. Cl.
*G02F 1/1343* (2006.01)
*G02F 1/1362* (2006.01)
*G02F 1/1368* (2006.01)

(52) U.S. Cl.
CPC .... *G02F 1/134363* (2013.01); *G02F 1/13439* (2013.01); *G02F 1/134336* (2013.01);
(Continued)

(58) Field of Classification Search
None
See application file for complete search history.

(56) References Cited

U.S. PATENT DOCUMENTS

2005/0094077 A1  5/2005  Baek
2007/0195250 A1  8/2007  Onogi et al.
(Continued)

FOREIGN PATENT DOCUMENTS

CN  1612024  5/2005
CN  101042510  9/2007
(Continued)

OTHER PUBLICATIONS

"First office action," CN Application No. 201710762641.4 (dated Oct. 30, 2019).

*Primary Examiner* — Michelle Mandala
(74) *Attorney, Agent, or Firm* — Womble Bond Dickinson (US) LLP

(57) ABSTRACT

An array substrate, a method for fabricating the same, and a display device are disclosed. The array substrate comprises a plurality of sub-pixels in a display region which are defined by gate lines and data lines intersecting with each other. The array substrate further comprises a common electrode and a pixel electrode on the substrate. The common electrode comprises a plurality of first strip-shaped sub-electrodes, wherein each of the first strip-shaped sub-electrodes runs through the display region; and a common electrode line which electrically connects all of the first strip-shaped sub-electrodes.

10 Claims, 4 Drawing Sheets

(52) U.S. Cl.
CPC ...... *G02F 1/136286* (2013.01); *G02F 1/1368* (2013.01); *G02F 2001/134318* (2013.01); *G02F 2001/134354* (2013.01); *G02F 2201/121* (2013.01)

(56) References Cited

U.S. PATENT DOCUMENTS

| | | | |
|---|---|---|---|
| 2008/0030640 A1* | 2/2008 | Hur | G02F 1/13624 349/48 |
| 2010/0085287 A1* | 4/2010 | Shimomaki | G02F 1/134363 345/87 |
| 2010/0194699 A1* | 8/2010 | Chang | G06F 3/044 345/173 |
| 2011/0063559 A1 | 3/2011 | Go | |
| 2011/0234936 A1* | 9/2011 | Yang | G02F 1/134363 349/46 |
| 2012/0099041 A1 | 4/2012 | Xie et al. | |
| 2013/0087794 A1 | 4/2013 | Kwack | |
| 2015/0060973 A1* | 3/2015 | Tsai | G02F 1/136213 257/309 |
| 2016/0133652 A1* | 5/2016 | Cao | G02F 1/136286 257/72 |
| 2016/0187732 A1 | 6/2016 | Zhao | |
| 2016/0291790 A1* | 10/2016 | Yao | G06F 3/0418 |
| 2016/0320650 A1* | 11/2016 | Ding | G02F 1/13338 |
| 2017/0075498 A1* | 3/2017 | Zhuang | G06F 3/0418 |

FOREIGN PATENT DOCUMENTS

| | | |
|---|---|---|
| CN | 102236222 | 11/2011 |
| CN | 102967977 | 3/2013 |
| CN | 103033999 | 4/2013 |
| CN | 103217840 | 7/2013 |
| JP | 2009075188 | 4/2009 |

* cited by examiner

ARRAY SUBSTRATE, METHOD FOR FABRICATING THE SAME, AND DISPLAY DEVICE

RELATED APPLICATIONS

The present application claims the benefit of Chinese Patent Application No. 201710762641.4, filed Aug. 29, 2017, the entire disclosure of which is incorporated herein by reference.

TECHNICAL FIELD

The present disclosure relates to the field of display technologies, and particularly relates to an array substrate, a method for fabricating the same, and a display device.

BACKGROUND

A TFT-LCD (thin film transistor liquid crystal display) has advantages of small volume, low power consumption, radiation-free, and low fabrication cost in applications as a tablet display device, and thus has been widely applied to the high performance display field.

SUMMARY

In one aspect, embodiments of the present disclosure provide an array substrate, comprising a plurality of sub-pixels in a display region which are defined by gate lines and data lines intersecting with each other, wherein the array substrate further comprises a common electrode and a pixel electrode on the substrate. The common electrode comprises a plurality of first strip-shaped sub-electrodes, wherein each of the first strip-shaped sub-electrodes runs through the display region; and a common electrode line which electrically connects all of the first strip-shaped sub-electrodes.

In one or more embodiments, the first strip-shaped sub-electrodes are arranged in parallel with the data lines.

In one or more embodiments, an orthogonal projection of the first strip-shaped sub-electrodes on the substrate covers an orthogonal projection of the data lines on the substrate.

In one or more embodiments, the pixel electrode is a planar electrode, and the common electrode is arranged on a side of the pixel electrode away from the substrate.

In one or more embodiments, the pixel electrode is a slit electrode which comprises a plurality of second strip-shaped sub-electrodes, and in each of the sub-pixels, an orthogonal projection of the first strip-shaped sub-electrodes on the substrate does not overlap an orthogonal projection of the second strip-shaped sub-electrodes on the substrate.

In one or more embodiments, the common electrode line and the first strip-shaped sub-electrodes are arranged in neighboring layers, and directly contact with each other.

In one or more embodiments, the common electrode line is arranged on a side of the first strip-shaped sub-electrodes away from the substrate.

In one or more embodiments, the common electrode line is arranged in parallel with the gate lines.

In one or more embodiments, each of the sub-pixels comprises a thin film transistor, and an orthogonal projection of the first strip-shaped sub-electrodes on the substrate does not overlap an orthogonal projection of an active layer of the thin film transistor on the substrate.

In one or more embodiments, the common electrode comprises a plurality of common electrode lines, and all first strip-shaped sub-electrodes which correspond to a row of sub-pixels are connected with a respective one of the common electrode lines.

In another aspect, embodiments of the present disclosure further provide a display device comprising the above array substrate.

In yet another aspect, embodiments of the present disclosure further provide method for fabricating an array substrate, the array substrate comprising a plurality of sub-pixels in a display region which are defined by gate lines and data lines intersecting with each other, wherein the method comprises: forming a pixel electrode in each of the sub-pixels on the substrate; on the substrate on which the pixel electrode has been formed, form a plurality of first strip-shaped sub-electrodes of a common electrode, wherein the first strip-shaped sub-electrodes are arranged in parallel, and each of the first strip-shaped sub-electrodes runs through the display region; and on the substrate on which the first strip-shaped sub-electrodes have been formed, directly forming a common electrode line which electrically connects all of the first strip-shaped sub-electrodes.

BRIEF DESCRIPTION OF THE DRAWINGS

In order to explain the technical solutions in the embodiments of the present disclosure more clearly, the drawings to be used in the description of the embodiments will be introduced briefly in the following, apparently, the drawings described below are only some embodiments of the present disclosure, a person with ordinary skill in the art, on the premise of not paying any creative work, can also obtain other drawings from these drawings.

DETAILED DESCRIPTION OF EMBODIMENTS

The present disclosure will be described in detail hereinafter with reference to the accompanying drawings and specific implementations, for purpose of better conveying technical solutions of the present disclosure to the skilled in the art.

Figure 1:
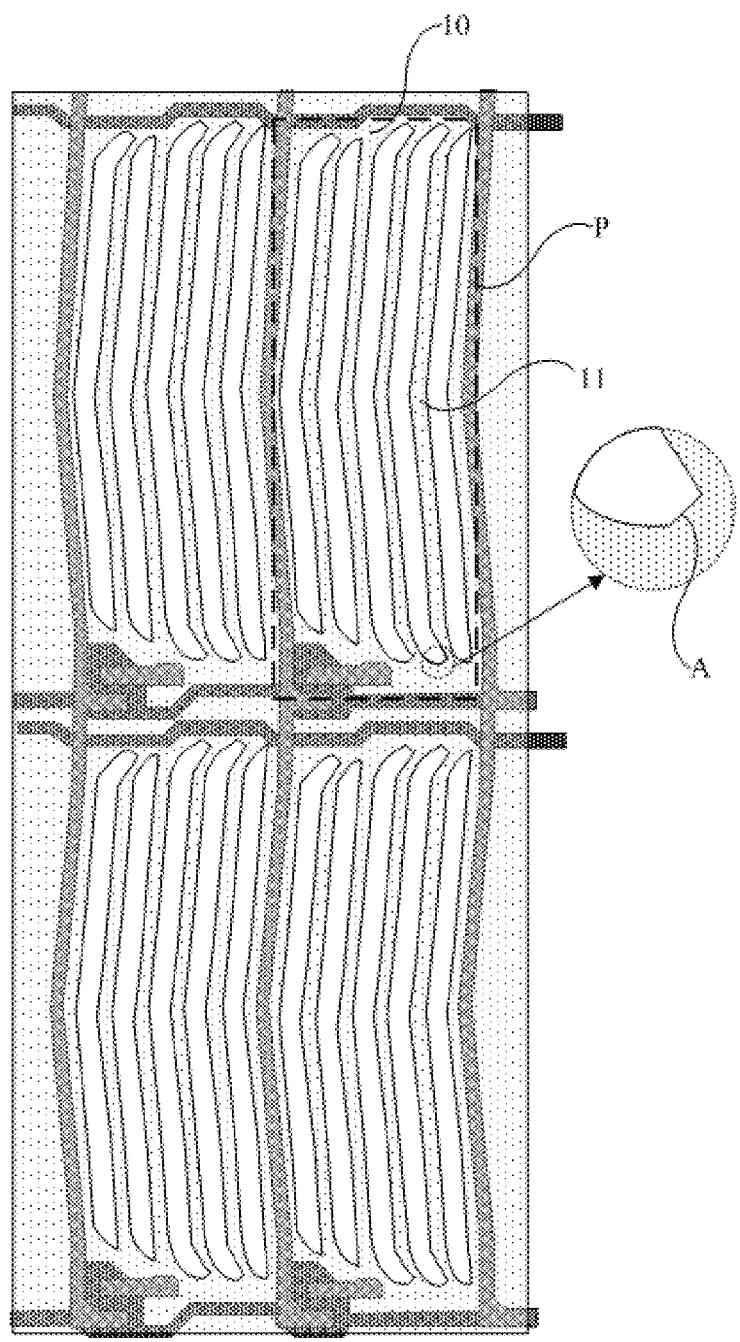
FIG. 1 is a structural view for illustrating an array substrate.

In a HADS (Higher Aperture Advanced Super Dimension Switch) type liquid crystal display device, both a pixel electrode and a common electrode of the display device are arranged in an array substrate. The pixel electrode is arranged closer to a substrate than the common electrode, and the pixel electrode is a planar electrode. The common electrode is a slit electrode comprising a plurality of strip-shaped sub-electrodes. In particular, as shown in FIG. 1, in each sub-pixel P, the strip-shaped sub-electrodes 11 of the slit electrode 10 has a turning A at an edge position (as shown in the enlarged portion in FIG. 1). During normal display, non-uniform electric field will be developed at the turning A, so that the display region of the sub-pixel has a dark state region at an edge corresponding to the turning. This has an adverse effect on the whole transmittance and the display quality of the display region of the sub-pixel.

Embodiments of the present disclosure provide an array substrate, a method for fabricating the same, and a display device, which can eliminate drawbacks of a non-uniform electric field due to the turning at the edge of common electrode in the sub-pixel.

Figure 2:
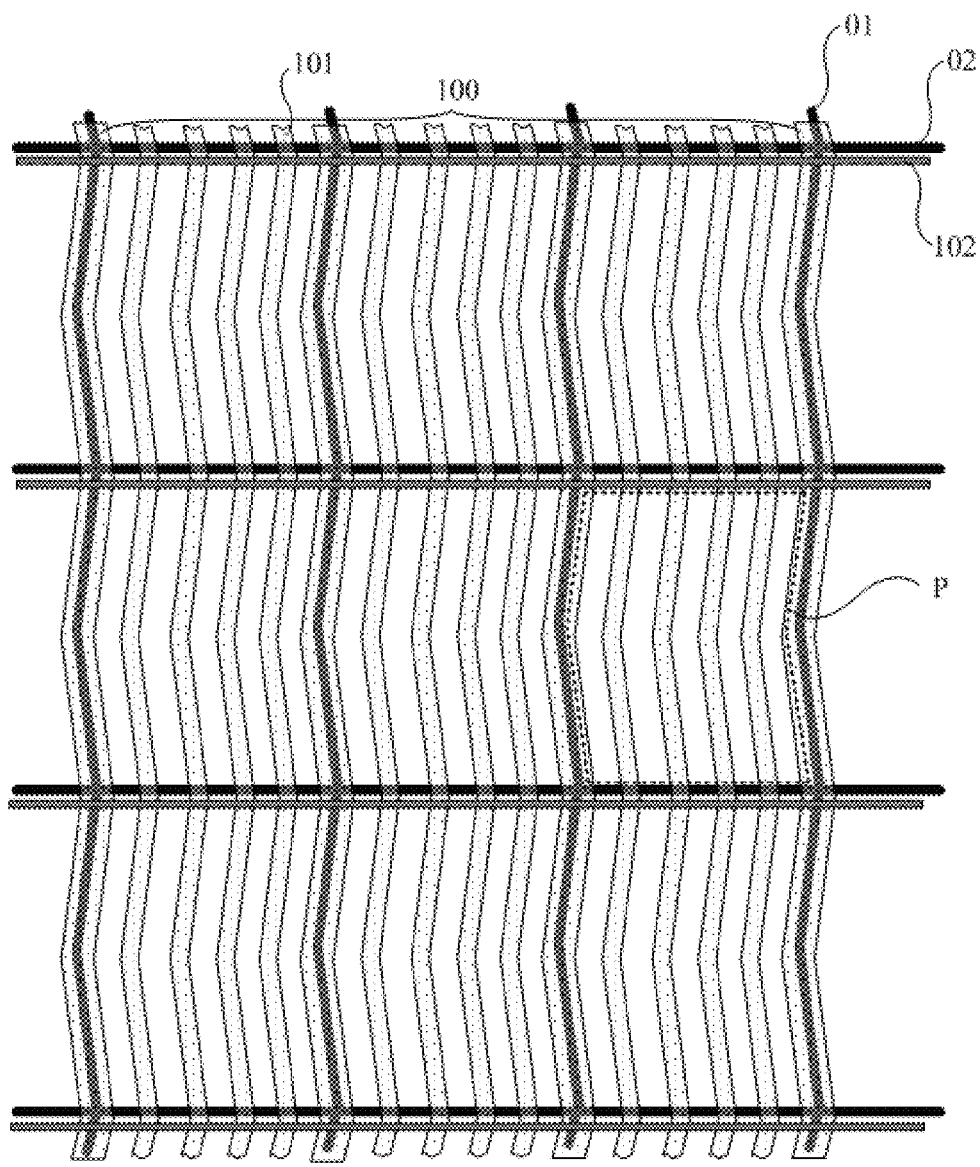
FIG. 2 is a structural view for illustrating an array substrate in an embodiment of the present disclosure.

Embodiments of the present disclosure provide an array substrate. As shown in FIG. 2, the array substrate comprises a plurality of sub-pixels P in a display region which are defined by data lines 01 and gate lines 02 intersecting with each other. The array substrate further comprises a common electrode 100 and the pixel electrode (not shown in FIG. 2) on a substrate.

On basis of this, as shown in FIG. 2, the common electrode 100 comprises a plurality of first strip-shaped sub-electrodes 101, wherein each of the first strip-shaped sub-electrodes 101 runs through the display region; and a common electrode line 102 which electrically connects all of the first strip-shaped sub-electrodes 101.

On basis of this, the plurality of first strip-shaped sub-electrodes of the common electrode run through the display region, i.e., the plurality of first strip-shaped sub-electrodes of the common electrode are individually arranged in the whole display region without turning. As a result, when the array substrate operates for display, a uniform electric field can be formed at the edge position of the sub-pixel, i.e., this can avoid drawbacks due to the non-uniform electric field arising from the turning at the edge of the common electrode.

It is noted that, the display region is a region of the array substrate in which a picture is normally displayed, and a plurality of sub-pixels are arranged in this region. FIG. 2 only shows a portion of the display region. On basis of this, each of the first strip-shaped sub-electrodes 101 runs through the display region indicates that the first strip-shaped sub-electrodes 101 run through the whole display region in an extending direction, and provide a drive signal to a column of sub-pixels in the display region.

Furthermore, the first strip-shaped sub-electrodes 101 running through the display region is compared with the strip-shaped sub-electrodes 11 in FIG. 1. As shown in FIG. 1, the strip-shaped sub-electrodes 11 only arranged in each sub-pixel, in other words, a horizontal connecting portion is arranged between the strip-shaped sub-electrodes 11 of neighboring sub-pixels in the extending direction of the strip-shaped sub-electrodes 11, for connecting the strip-shaped sub-electrodes 11 of neighboring sub-pixels. This leads to the strip-shaped sub-electrodes 11 of neighboring sub-pixels in the extending direction are independent from each other. In contrast, in the present disclosure, the first strip-shaped sub-electrodes 101 is an integral structure which runs through a column of sub-pixels, in other words, the strip-shaped sub-electrodes 11 have a strip shape which runs through a column of sub-pixels and comprise no connecting portion.

The expression that common electrode line 102 electrically connects all of the first strip-shaped sub-electrodes 101 as described above indicates the first strip-shaped sub-electrodes 101 are electrically connected together by the common electrode line 102. Namely, it is required to ensure that a signal input through the common electrode line 102 can be transmitted to any position in the first strip-shaped sub-electrodes 101.

The first strip-shaped sub-electrodes 101 can have a straight line shape, or a non-straight line shape (e.g., a bending shape in FIG. 2), and embodiments of the present disclosure are not limited in this regard.

In the present disclosure, the first strip-shaped sub-electrodes 101 can be arranged in parallel with the data lines 01 or the gate lines 02. Alternatively, the first strip-shaped sub-electrodes 101 can be arranged in parallel with neither the data lines 01 nor the gate lines 02, i.e., arranged in a tilted direction, and embodiments of the present disclosure are not limited in this regard. In view of actual requirements (about e.g., aperture, fabricating process) in most array substrates, as shown in FIG. 2, the first strip-shaped sub-electrodes 101 are arranged in parallel with the data lines 01. On basis of this, it should be understood that all of the first strip-shaped sub-electrodes 101 are arranged in parallel, i.e., an interval between any two neighboring first strip-shaped sub-electrodes 101 is constant.

Furthermore, the person with ordinary skill in the art will appreciate that, the first strip-shaped sub-electrodes 101 are arranged in a layer different from the data lines 01. By the expression the first strip-shaped sub-electrodes 101 are arranged in parallel with the data lines 01, it is meant that an orthogonal projection of the first strip-shaped sub-electrodes 101 on the substrate is parallel with that of the data lines 01, i.e., the orthogonal projection of the first strip-shaped sub-electrodes 101 and that of the data lines 01 have a constant interval. Of course, as for the first strip-shaped sub-electrodes 101 directly facing the data lines 01, their orthogonal projections on the substrate comprise an overlapping region. In this case, it is only required to ensure the first strip-shaped sub-electrodes 101 and the data lines 01 has a consistent extending direction at any directly facing position.

Further, in case the first strip-shaped sub-electrodes 101 are arranged in parallel with the data lines 01, as shown in FIG. 2, the common electrode line 102 are arranged in parallel with the gate lines 02. As for the common electrode line 102 and the gate lines 02 which are arranged in parallel, reference can be made to the above embodiment in which the first strip-shaped sub-electrodes 101 are arranged in parallel with the data lines 01. The person with ordinary skill in the art will appreciate that, in order to avoid the common electrode line 102 from affecting the aperture of sub-pixels, the common electrode line 102 is generally arranged at a position between two neighboring rows of sub-pixels in the extending direction of the first strip-shaped sub-electrodes 101. In the following embodiments, the present disclosure will be further described by referring to a case in which the first strip-shaped sub-electrodes 101 are arranged in parallel with the data lines 01, and the common electrode line 102 are arranged in parallel with the gate lines 02.

Figure 3:
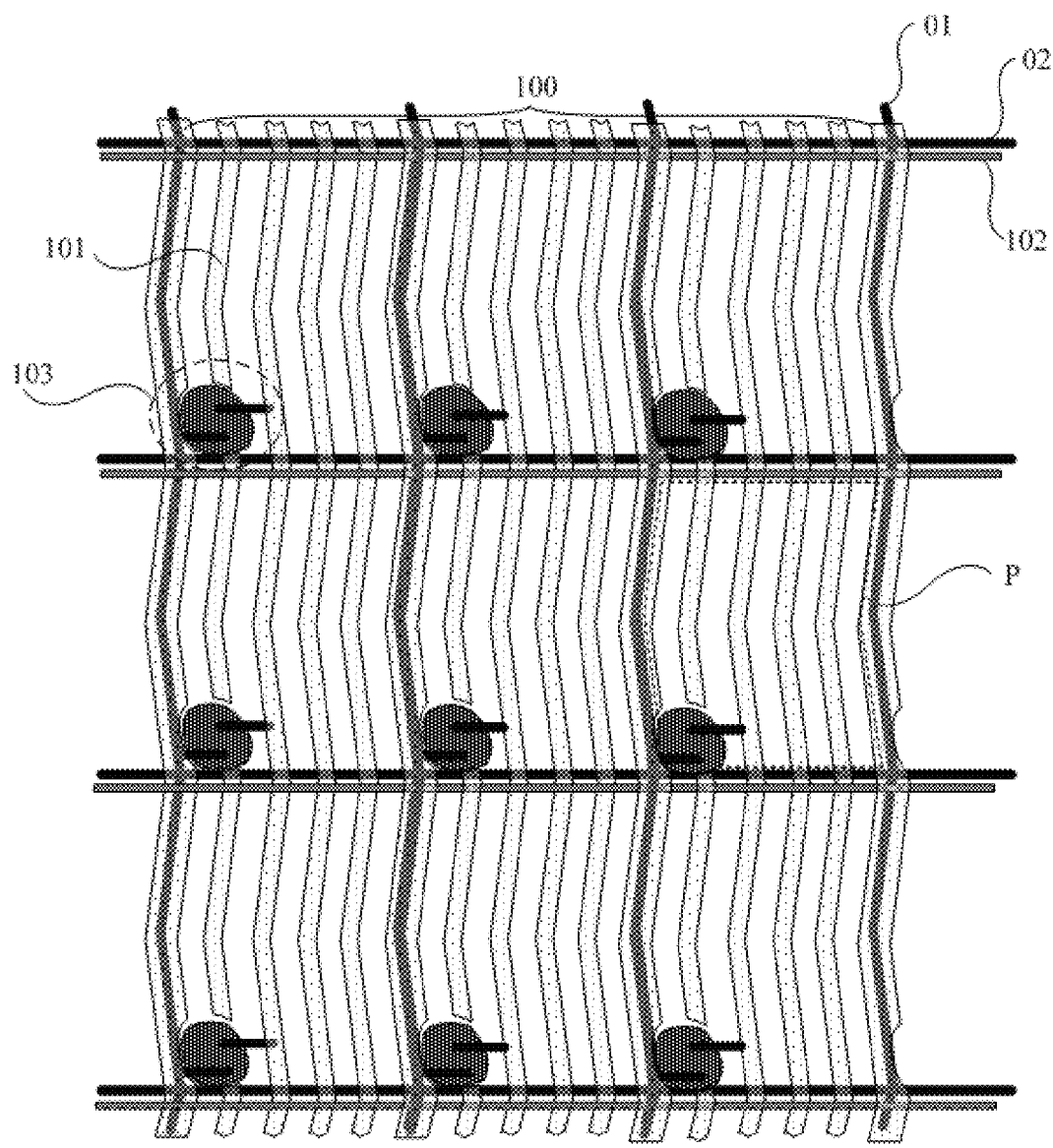
FIG. 3 is a structural view for illustrating another array substrate in an embodiment of the present disclosure.

On basis of this, as shown in FIG. 3, each sub-pixel P comprises a thin film transistor (TFT) 103. When the array substrate operates for displaying, the signal applied to the first strip-shaped sub-electrodes 101 may affect the channel portion of the thin film transistor 103, which leads to variation in performance of the thin film transistor, and thus adversely affects the displayed picture. In order to avoid this, as shown in FIG. 3, the first strip-shaped sub-electrodes 101 are disconnected at a position directly facing the thin film transistor 103.

The expression a position of the first strip-shaped sub-electrodes 101 directly facing the thin film transistor 103 means an overlapping region between the orthogonal projection of the first strip-shaped sub-electrodes 101 on the substrate and the orthogonal projection of the thin film transistor 103 on the substrate. Namely, by the expression the first strip-shaped sub-electrodes 101 are disconnected at a position directly facing the thin film transistor 103, it is meant that the first strip-shaped sub-electrodes 101 are disconnected at the overlapping region between the orthogonal projection of the first strip-shaped sub-electrodes 101 on the substrate and the orthogonal projection of the thin film transistor 103 on the substrate.

It is further noted that, since the first strip-shaped sub-electrodes 101 are disconnected at the position directly facing the thin film transistor, in order to ensure that all of the first strip-shaped sub-electrodes 101 are electrically connected through the common electrode line 102, it is required to provide a plurality of common electrode lines 102 for electrically connecting all of the first strip-shaped sub-electrodes 101. On basis of this, as shown in FIG. 3, first strip-shaped sub-electrodes of the first strip-shaped sub-electrodes 101 which correspond to a row of sub-pixels are connected with a respective common electrode line, to ensure all of the first strip-shaped sub-electrodes are electrically connected through the common electrode lines.

In case the first strip-shaped sub-electrodes 101 are arranged in other manners, they can also be connected through the above common electrode lines, and embodiments of the present disclosure are not limited in this regard.

On basis of this, embodiments of the present disclosure are not limited to the manner in which the common electrode line 102 is connected with the first strip-shaped sub-electrodes 101. For example, in case there is an insulating layer between a layer in which the common electrode line 102 is arranged and a layer in which the first strip-shaped sub-electrodes 101 are arranged, vias can be arranged in the insulating layer, so that the common electrode line 102 is electrically connected with the first strip-shaped sub-electrodes 101 through the vias. In another example, in case the common electrode line 102 and the first strip-shaped sub-electrodes 101 are arranged in two neighboring layers, the common electrode line 102 can be arranged to directly contact the first strip-shaped sub-electrodes 101, so that they are electrically connected with each other.

In case the connection is realized through the vias, it is required to arrange vias at positions of each of the first strip-shaped sub-electrodes 101 corresponding with the common electrode line 102, so that it is ensured that the common electrode line 102 electrically connects all of the first strip-shaped sub-electrodes 101. As a result, the fabricating process is complicated, and the accuracy requirements are harsh. Thus, in embodiments of the present disclosure, the common electrode line 102 and the first strip-shaped sub-electrodes 101 are arranged in two neighboring layers, and directly contact with each other.

On basis of this, in case the common electrode line 102 and the first strip-shaped sub-electrodes 101 are arranged in two neighboring layers, in order to ensure the first strip-shaped sub-electrodes 101 is smooth as much as possible to reduce adverse effect on the uniformity of electric field, the common electrode line 102 is arranged on a side of the first strip-shaped sub-electrodes 101 away from the substrate. Namely, the first strip-shaped sub-electrodes 101 are formed firstly, and then the common electrode line 102 is formed.

Further, in order to avoid an electric field is formed between the data lines 01 and the first strip-shaped sub-electrodes 101 over the data lines 01, and liquid crystal molecules are subject to unwanted deflection of under this electric field, which would bring about an adverse effect on the displayed picture, as shown in FIG. 2 or FIG. 3, the orthogonal projection of the first strip-shaped sub-electrodes 101 on the substrate covers the orthogonal projection of the data lines 01 on the substrate. In this way, the first strip-shaped sub-electrodes 101 can shield the data lines 01, so as to avoid an electric field from being formed between the first strip-shaped sub-electrodes 101 and the data lines 01 at corresponding positions, which would otherwise adversely affect the display quality.

By the expression the orthogonal projection of the first strip-shaped sub-electrodes 101 on the substrate covers the orthogonal projection of the data lines 01 on the substrate, it is meant that the orthogonal projection of the first strip-shaped sub-electrodes 101 on the substrate has an outer contour which extends beyond that of the orthogonal projection of the data lines 01 on the substrate, i.e., it is required to ensure the orthogonal projection of the first strip-shaped sub-electrodes 101 has a width larger than that of the orthogonal projection of the data lines 01. As a result, the first strip-shaped sub-electrodes can effectively shield the data lines.

Hereinafter, the arrangement of the pixel electrode in embodiments of the present disclosure will be described.

In case the common electrode 100 is arranged in any one of the manners as described above, the pixel electrode can be a planar electrode, and the common electrode 100 is arranged on a side of the pixel electrode away from the substrate. Namely, there is one planar pixel electrode in different sub-pixels. It should be understood that in this case, the array substrate is a HADS type array substrate.

The pixel electrode can also be a slit electrode. In this case, the pixel electrode comprises strip-shaped sub-electrodes, and in different sub-pixels, the first strip-shaped sub-electrodes 101 correspond to slit positions of the pixel electrode. Namely, the first strip-shaped sub-electrodes 101 are spaced apart from the strip-shaped sub-electrodes of the pixel electrode. Of course, the first strip-shaped sub-electrodes 101 and the strip-shaped sub-electrodes of the pixel electrode are spaced apart and arranged in different layers in this example. In this case, the common electrode 100 can be located on a side of the pixel electrode away from the substrate, or a side of the pixel electrode close to the substrate, and embodiments of the present disclosure are not limited in this regard.

Figure 4:
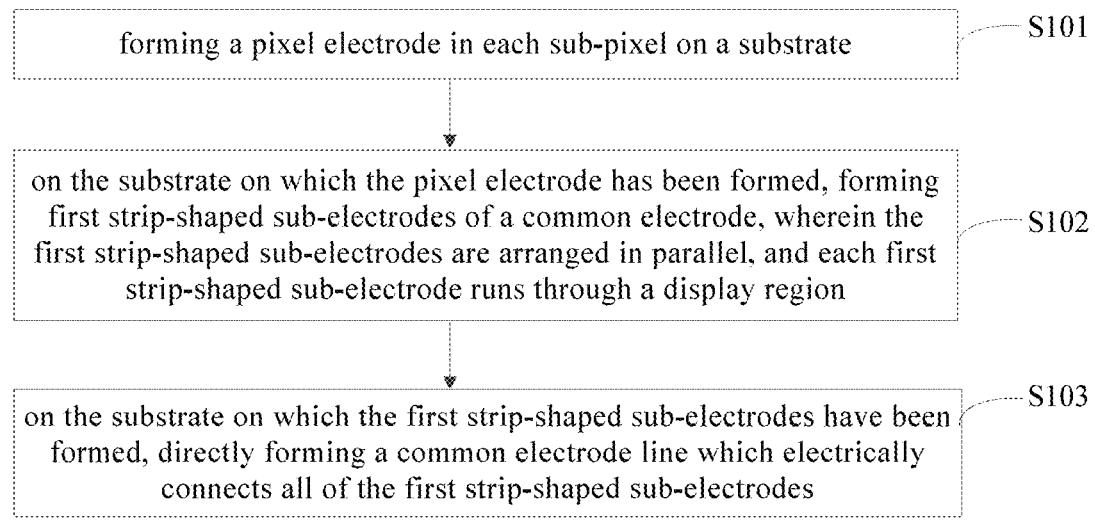
FIG. 4 is a flow chart for illustrating a method for fabricating an array substrate in an embodiment of the present disclosure.

Embodiments of the present disclosure further provide a method for fabricating an array substrate. The array substrate comprises a plurality of sub-pixels in the display region defined by gate lines and data lines intersecting with each other. As shown in FIG. 4, the method comprises the following steps (reference is made to structural views of an array substrate in FIG. 2 or FIG. 3).

Step S101, forming a pixel electrode in each of the sub-pixels on the substrate.

In particular, a planar pixel electrode is formed in each sub-pixel on the substrate. Alternatively, a slit shaped pixel electrode comprising plurality of second strip-shaped sub-electrodes can be formed. Of course, the pixel electrode generally is made from a transparent conductive material, for example, Indium tin oxide (ITO).

It is noted that, the above substrate does not mean an individual substrate. The person with ordinary skill in the art will appreciate that, prior to forming the pixel electrode, a portion or all portions of the thin film transistor and other components, for example, gate layer (Gate), gate insulating layer (GI), active layer (Active) may be formed on the substrate. Of course a source/drain layer (SD) can be formed either prior to forming the pixel electrode, or after forming the pixel electrode, provided that the pixel electrode is electrically connected with a drain.

Step S102, on the substrate on which the pixel electrode has been formed, forming a plurality of first strip-shaped sub-electrodes 101 of a common electrode 100, wherein the first strip-shaped sub-electrodes 101 are arranged in parallel, and each of the first strip-shaped sub-electrodes 101 runs through the display region.

In particular, in case the pixel electrode comprises a plurality of second strip-shaped sub-electrodes, the second strip-shaped sub-electrodes are spaced apart from the first strip-shaped sub-electrodes of the common electrode (in different layers), so that the array substrate can operate normally. The orthogonal projection of the first strip-shaped sub-electrodes 101 on the substrate does not overlap that of the second strip-shaped sub-electrodes on the substrate.

The common electrode is generally made from a transparent conductive material, for example, ITO.

Step S103, on the substrate on which the first strip-shaped sub-electrodes 101 have been formed, directly forming a common electrode line 102 which electrically connects all of the first strip-shaped sub-electrodes 101.

In particular, the common electrode line is directly formed on the first strip-shaped sub-electrodes, so that the common electrode line 102 directly contacts and is electrically connected with the first strip-shaped sub-electrodes 101. This ensures the connection effect between the common electrode line and first strip-shaped sub-electrodes, and reduces the fabricating accuracy. The common electrode line can be made from a metal conductive material with good conduction performance.

It is noted that, similar to other arrangement schemes in the above embodiments for array substrate, the fabricating method can comprise other steps, which are not repeated for simplicity.

Since the plurality of first strip-shaped sub-electrodes of the common electrode are arranged in parallel and run through the display region, i.e., the plurality of first strip-shaped sub-electrodes of the common electrode are arranged in parallel in the whole display region without a turning. In this way, when the array substrate operates for displaying, a uniform electric field can be formed at an edge position of the sub-pixel. This can eliminate drawbacks of a non-uniform electric field due to the turning at the edge of common electrode.

Embodiments of the present disclosure further provide a display device, comprising the array substrate as described. The display device has the same structural and beneficial effects as those of the array substrate in the above embodiments. The structural and beneficial effects of the array substrate have been described in the above embodiments, and are not repeated here for simplicity.

It is noted that, in embodiments of the present disclosure, the display device can comprise a liquid crystal display panel, and the display panel can be applied to a product or component with a display function, such as a LCD display device, a LCD TV, a digital photo frame, a mobile phone, or a tablet computer.

Apparently, the person with ordinary skill in the art can make various modifications and variations to the present disclosure without departing from the spirit and the scope of the present disclosure. In this way, provided that these modifications and variations of the present disclosure belong to the scopes of the claims of the present disclosure and the equivalent technologies thereof, the present disclosure also intends to encompass these modifications and variations.

What is claimed is:

1. An array substrate, comprising a plurality of sub-pixels in a display region which are defined by gate lines and data lines intersecting with each other, wherein the array substrate further comprises a common electrode and a pixel electrode on the substrate,
wherein the common electrode comprises a plurality of first strip-shaped sub-electrodes, each of the first strip-shaped sub-electrodes is a continuous electrode and runs through sub-pixels in the display region in an extending direction of the first strip-shaped sub-electrodes; and a common electrode line which electrically connects all of the first strip-shaped sub-electrodes
wherein the first strip-shaped sub-electrodes are arranged in parallel with the data lines, and an orthogonal projection of the data lines on the substrate falls within an orthogonal projection of the first strip-shaped sub-electrodes on the substrate.

2. The array substrate of claim 1, wherein the pixel electrode is a planar electrode, and the common electrode is arranged on a side of the pixel electrode away from the substrate.

3. The array substrate of claim 1, wherein the pixel electrode is a slit electrode which comprises a plurality of second strip-shaped sub-electrodes, and in each of the sub-pixels, an orthogonal projection of the first strip-shaped sub-electrodes on the substrate does not overlap an orthogonal projection of the second strip-shaped sub-electrodes on the substrate.

4. The array substrate of claim 1, wherein the common electrode line and the first strip-shaped sub-electrodes are arranged in neighboring layers, and directly contact with each other.

5. The array substrate of claim 4, wherein the common electrode line is arranged on a side of the first strip-shaped sub-electrodes away from the substrate.

6. The array substrate of claim 1, wherein the common electrode line is arranged in parallel with the gate lines.

7. The array substrate of claim 1, wherein each of the sub-pixels comprises a thin film transistor, and an orthogonal projection of the first strip-shaped sub-electrodes on the substrate does not overlap an orthogonal projection of an active layer of the thin film transistor on the substrate.

8. The array substrate of claim 7, wherein the common electrode comprises a plurality of common electrode lines, and all first strip-shaped sub-electrodes which correspond to a row of sub-pixels are connected with a respective one of the common electrode lines.

9. A display device, comprising the array substrate of claim 1.

10. A method for fabricating an array substrate, the array substrate comprising a plurality of sub-pixels in a display region which are defined by gate lines and data lines intersecting with each other, wherein the method comprises:
forming a pixel electrode in each of the sub-pixels on the substrate;
on the substrate on which the pixel electrode has been formed, form a plurality of first strip-shaped sub-electrodes of a common electrode, wherein the first strip-shaped sub-electrodes are arranged in parallel with the data lines, each of the first strip-shaped sub-electrodes is a continuous electrode and runs through sub-pixels in the display region in an extending direction of the first strip-shaped sub-electrodes, and an orthogonal projection of the data lines on the substrate falls within an orthogonal projection of the first strip-shaped sub-electrodes on the substrate; and
on the substrate on which the first strip-shaped sub-electrodes have been formed, directly forming a common electrode line which electrically connects all of the first strip-shaped sub-electrodes.

* * * * *